(12) United States Patent
Endo

(10) Patent No.: US 12,474,424 B2
(45) Date of Patent: Nov. 18, 2025

(54) SAMPLE TUBE TRANSPORT APPARATUS

(71) Applicant: JEOL Ltd., Tokyo (JP)

(72) Inventor: Yuki Endo, Tokyo (JP)

(73) Assignee: JEOL Ltd., Tokyo (JP)

( * ) Notice: Subject to any disclaimer, the term of this patent is extended or adjusted under 35 U.S.C. 154(b) by 169 days.

(21) Appl. No.: 18/237,486

(22) Filed: Aug. 24, 2023

(65) Prior Publication Data

US 2024/0069129 A1     Feb. 29, 2024

(30) Foreign Application Priority Data

Aug. 26, 2022 (JP) ................. 2022-134803

(51) Int. Cl.
G01R 33/30 (2006.01)

(52) U.S. Cl.
CPC .................. G01R 33/307 (2013.01)

(58) Field of Classification Search
None
See application file for complete search history.

(56) References Cited

U.S. PATENT DOCUMENTS

| | | | | |
|---|---|---|---|---|
| 9,903,923 | B2* | 2/2018 | Schett | G01R 33/307 |
| 2006/0176056 | A1* | 8/2006 | Doty | G01R 33/307 |
| | | | | 324/321 |
| 2008/0136413 | A1* | 6/2008 | Doty | G01R 33/307 |
| | | | | 324/321 |
| 2010/0026302 | A1* | 2/2010 | Doty | G01R 33/34015 |
| | | | | 324/318 |
| 2010/0109666 | A1* | 5/2010 | Armbruster | G01R 33/34 |
| | | | | 324/318 |
| 2010/0156422 | A1 | 6/2010 | de Vries et al. | |
| 2013/0207656 | A1 | 8/2013 | Shinagawa et al. | |
| 2014/0125340 | A1 | 5/2014 | Hunkeler et al. | |
| 2016/0334478 | A1 | 11/2016 | Osen et al. | |
| 2018/0259602 | A1 | 9/2018 | Endo et al. | |
| 2021/0278487 | A1 | 9/2021 | Endo et al. | |
| 2024/0409871 | A1* | 12/2024 | Blanchard | G01N 15/0227 |

FOREIGN PATENT DOCUMENTS

| | | |
|---|---|---|
| JP | 7065137 B2 | 5/2002 |
| JP | 2010151815 A | 7/2010 |
| JP | 2013167463 A | 8/2013 |
| JP | 2014149291 A | 8/2014 |
| JP | 6016373 B2 | 10/2016 |
| JP | 2018146445 A | 9/2018 |
| JP | 6445484 B2 | 12/2018 |
| JP | 6876471 B2 | 5/2021 |

OTHER PUBLICATIONS

Extended European Search Report issued in EP23192023.2 on Jan. 31, 2024.
Office Action issued in JP2022-134803 on Oct. 8, 2024.

* cited by examiner

Primary Examiner — Rodney E Fuller
(74) Attorney, Agent, or Firm — The Webb Law Firm

(57) ABSTRACT

A load unit jets a load gas from a cone-shaped slit to a first position located in a pathway. As a result, a first gas stream for loading a sample tube is generated. An eject unit jets an eject gas from a cone-shaped slit to a second position in the pathway. As a result, a second gas stream for ejecting a sample tube is generated.

9 Claims, 13 Drawing Sheets

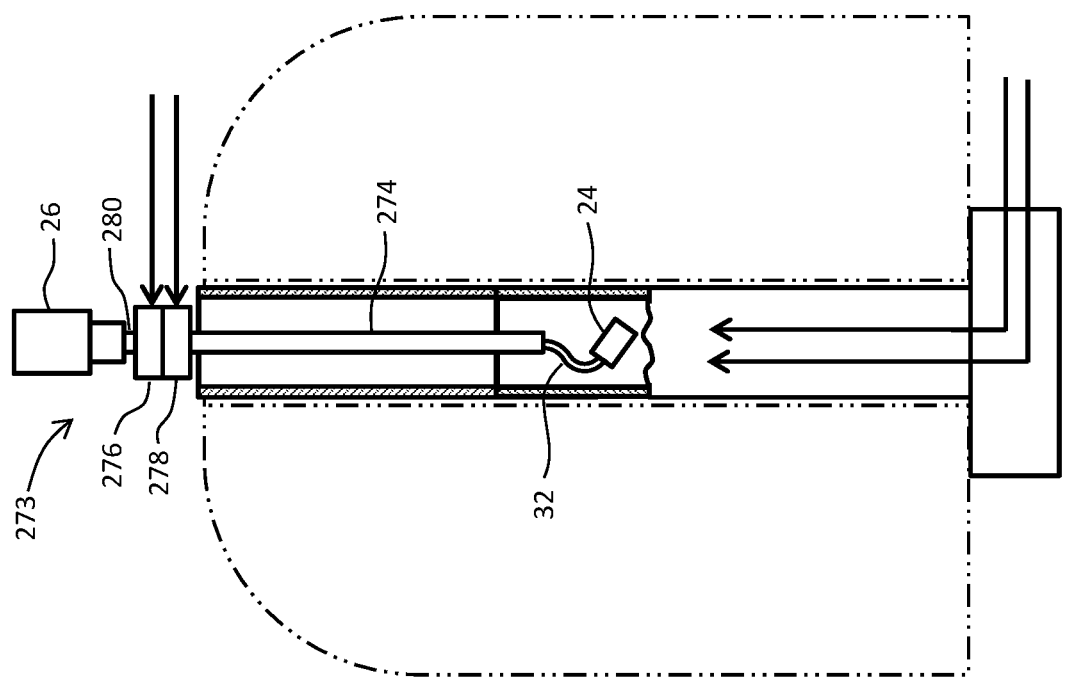

SAMPLE TUBE TRANSPORT APPARATUS

CROSS REFERENCE TO RELATED APPLICATION

This application claims priority to Japanese Patent Application No. 2022-134803 filed Aug. 26, 2022, the disclosure of which is hereby incorporated by reference in its entirety.

BACKGROUND OF THE DISCLOSURE

Field of the Disclosure

The present disclosure relates to a sample tube transport apparatus, and more particularly to a technique of transporting a sample tube between a sample tube container and a sample tube spinner in an NMR measurement system.

Description of Related Art

An NMR (nuclear magnetic resonance) measurement system is a system configured to measure NMR occurring in a sample in order to analyze the sample. An NMR measurement system comprises a static magnetic field generator, an NMR measurement probe, a spectrometer, and the like.

When the target of NMR measurement is a solid sample, the MAS (magic angle spinning) technique is typically employed. According to the MAS technique, NMR measurement is performed with respect to a solid sample inside a sample tube while the sample tube is caused to perform a spinning motion while in a state of being tilted at a predetermined angle (of approximately 54.7 degrees) relative to the direction of a static magnetic field. The solid sample is, for example, a powder. In implementing the MAS technique, a sample tube spinner (hereinafter simply referred to as "spinner") is provided inside the NMR measurement probe. In the spinner, the sample tube caused to perform a spinning motion is a rotor, and the spinner itself is a stator. The spinner is also called a MAS module.

In setting the sample tube in the spinner and in removing the sample tube from the spinner, if the user is required to remove and mount the NMR measurement probe, a considerable workload is imposed on the user.

In order to facilitate replacement of sample tubes, there has been proposed a sample tube transport apparatus. A sample tube transport apparatus is an apparatus configured to automatically transport a sample tube between a sample tube container (hereinafter simply referred to as "container") and the spinner. The container is, for example, a sample tube carrier.

In sample tube transport apparatuses disclosed in JP 6016373 B and JP 6876471 B, a sample tube is transported between a container provided above a static magnetic field generator and a spinner located inside the static magnetic field generator. At a midway point in the pathway between the container and the spinner, a unit for ejecting the sample tube is provided. This unit has a jet orifice from which gas is jetted into the pathway from a direction tilted relative to the central axis of the pathway. As a result of the jetting of the gas, a gas stream from the spinner toward the container is generated. This gas stream causes the sample tube to be ejected. JP 6016373 and JP 6876471 B do not disclose any specific configuration that functions in loading a sample tube.

In a sample tube transport apparatus disclosed in JP 6445484 B, a sample tube is transported between a container provided below a static magnetic field generator and a spinner located inside the static magnetic field generator. Although the transport of the sample tube is carried out by a gas stream, no specific configuration for generating the gas stream is disclosed in JP 6445484 B.

It is desired that, in a sample tube transport apparatus in an NMR measurement system, an appropriate amount of transporting force is provided to a sample tube over the entire pathway along which the sample tube moves. More specifically, it is desired that fracture and wear of a sample tube are avoided, and simultaneously, stopping of the sample tube at a midway point in the pathway is avoided. Recently, sample tubes with increasingly smaller diameters are being used, and such sample tubes easily stop at a midway point in the pathway due to causes such as static electricity and soiling on the sample tube surface. At the time of loading a sample tube, if the sample tube stops at a midway point in the pathway, NMR measurement with respect to the sample cannot be performed.

SUMMARY OF THE DISCLOSURE

An object of the present disclosure is to reliably transport a sample tube while protecting the sample tube. Another object of the present disclosure is to transport a sample tube in a manner such that the attitude of the sample tube does not become unstable.

A sample tube transport apparatus according to an aspect of the present disclosure includes: a load unit configured to, before NMR measurement is performed with respect to a sample inside a sample tube, jet a load gas to a first position in a pathway between a sample tube container and a sample tube spinner, and thereby generate a first gas stream that transports the sample tube from the sample tube container to the sample tube spinner; and an eject unit configured to, after NMR measurement is performed with respect to the sample, jet an eject gas to a second position in the pathway, and thereby generate a second gas stream that transports the sample tube from the sample tube spinner to the sample tube container.

BRIEF DESCRIPTION OF DRAWINGS

Embodiment(s) of the present disclosure will be described based on the following figures, wherein:

FIG. 13 is a diagram showing a sample tube transport apparatus according to another embodiment.

DESCRIPTION OF NON-LIMITING EMBODIMENTS OF THE DISCLOSURE

Figure 1:
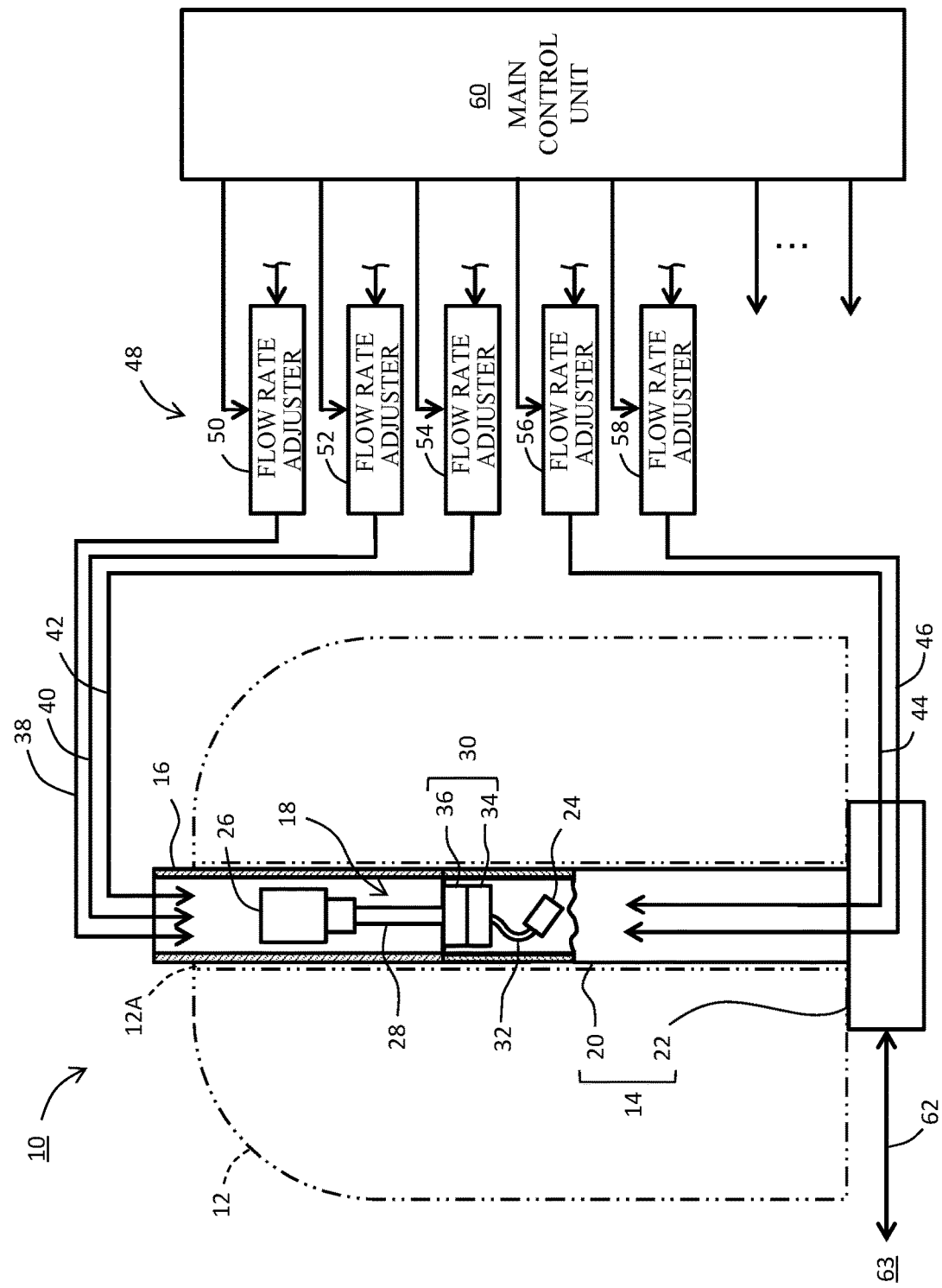
FIG. 1 is a diagram showing an NMR measurement system including a sample tube transport apparatus according to an embodiment.

Embodiments will be described below by reference to the drawings.

(1) Overview of Embodiments

A sample tube transport apparatus according to an embodiment includes a load unit and an eject unit. The load unit is configured to, before NMR measurement is performed with respect to a sample inside a sample tube, jet a load gas to a first position in a pathway between a sample tube container and a sample tube spinner, and thereby generate a first gas stream that transports the sample tube from the sample tube container to the sample tube spinner. The eject unit is configured to, after NMR measurement is performed with respect to the sample, jet an eject gas to a second position in the pathway, and thereby generate a second gas stream that transports the sample tube from the sample tube spinner to the sample tube container.

According to the above configuration, since both the load unit and the eject unit are provided, loading of the sample tube and ejection of the sample tube can be carried out reliably. Describing in more detail, since a gas (i.e., the load gas or the eject gas) is delivered to a position (i.e., the first position or the second position) at a midway point in the pathway and a gas stream (i.e., the first gas stream or the second gas stream) is thereby generated, an appropriate amount of transporting force can be imparted to the sample tube over the entire pathway. Accordingly, it is possible to reliably transport the sample tube while protecting the sample tube.

In the above configuration, the sample tube container is a component provided at one end of the pathway. The sample tube container is, for example, a carrier, a holder, a magazine rack, an input port, or the like. The sample tube spinner is a module provided at the other end of the pathway, and specifically serves to cause the sample tube to perform a spinning motion according to the MAS technique. The sample tube may be input from an upper side of a static magnetic field generator, or may be input from a lower side of the static magnetic field generator. A part of the pathway may constitute a curved portion. A direction changer may be provided at a midway point in the pathway.

In an embodiment, the load unit includes a first slit which has a first outlet oriented toward the sample tube spinner and through which the load gas is jetted into the pathway. The eject unit includes a second slit which has a second outlet oriented toward the sample tube container and through which the eject gas is jetted into the pathway.

At the time of loading the sample tube, when the load gas is delivered to the first position from the first outlet, gas present upstream of the first position is drawn downstream, and at the same time, gas present at the first position is pushed out downstream. That is, a first upstream gas stream is generated in a segment upstream of the first position ("first upstream segment"), and a first downstream gas stream is generated in a segment downstream of the first position ("first downstream segment"). In an embodiment, a negative pressure is generated in the first upstream segment, and via the one end of the pathway or the like, atmospheric air present outside flows into the first upstream segment. Further, in an embodiment, a positive pressure is generated in the first downstream segment, and via the other end of the pathway or the like, gas is discharged outside. Accordingly, a transporting force provided by the first upstream gas stream is prevented from being excessively large, and in addition, a transporting force provided by the first downstream gas stream is prevented from being excessively small. The first upstream gas stream and the first downstream gas stream constitute the first gas stream. The first gas stream exerts, over its entire extent, an appropriate amount of transporting force.

Meanwhile, at the time of ejecting the sample tube, when the eject gas is delivered to the second position from the second outlet, gas present upstream of the second position is drawn downstream, and gas present at the second position is pushed out downstream. That is, a second upstream gas stream is generated in a segment upstream of the second position ("second upstream segment"), and a second downstream gas stream is generated in a segment downstream of the second position ("second downstream segment"). In an embodiment, a negative pressure is generated in the second upstream segment, and via the other end of the pathway or the like, atmospheric air present outside flows into the second upstream segment. Further, in an embodiment, a positive pressure is generated in the second downstream segment, and via the one end of the pathway or the like, gas is discharged outside. Accordingly, a transporting force provided by the second upstream gas stream is prevented from being excessively large, and in addition, a transporting force provided by the second downstream gas stream is prevented from being excessively small. The second upstream gas stream and the second downstream gas stream constitute the second gas stream. The second gas stream exerts, over its entire extent, an appropriate amount of transporting force.

In an embodiment, each of the first slit and the second slit is a cone-shaped slit. Each of the first outlet and the second outlet is an annular outlet. The cone-shaped slit surrounds the pathway; in other words, the pathway passes through the cone-shaped slit. According to this configuration, at the time of loading the sample tube, the load gas is jetted from a position surrounding the sample tube toward the side surface of the sample tube when the sample tube passes the first position, so that the sample tube is prevented from being placed in an unstable attitude. Further, at the time of ejecting the sample tube, the eject gas is jetted from a position surrounding the sample tube toward the side surface of the sample tube when the sample tube passes the second position, thereby preventing placement of the sample tube in an unstable attitude.

In an embodiment, of the first position and the second position, the one closer to the sample tube spinner is the first position, and the one closer to the sample tube container is the second position. According to this configuration, the second position can be set within the first upstream segment (that is, within a negative pressure segment), and the first position can be set within the second upstream segment (that is, within a negative pressure segment). Accordingly, at the time of loading the sample tube, it is possible to prevent placement of the sample tube in an unstable attitude when the sample tube passes the second position. Further, at the time of ejecting the sample tube, it is possible to prevent placement of the sample tube in an unstable attitude when the sample tube passes the first position. In general, negative pressure and positive pressure are defined relative to the atmospheric pressure or outside pressure.

In an embodiment, the load unit and the eject unit are joined to each other. This configuration facilitates alignment of the central axes of the two units (or more specifically, the central axes of two internal pathways). Further, it becomes easy to arrange the first position and the second position close to each other.

In an embodiment, the sample tube spinner comprises a thrust gas bearing configured to spray gas on one end face of the sample tube received in the sample tube spinner. The load unit generates the first gas stream while in a spinning state in which the sample tube is spinning inside the sample tube spinner. While in the spinning state, gas provided by the first gas stream is sprayed on the other end face of the sample tube. According to this configuration, while the sample tube is in the spinning state, the position of the sample tube in the direction of the spinning central axis can be stabilized.

In an embodiment, the eject unit generates the second gas stream even after the sample tube is returned to inside the sample tube container. According to this configuration, it is possible to prevent entry of foreign matters into the pathway. In an embodiment, the second gas stream is continuously generated after the sample tube container has floated up.

A sample tube transport apparatus according to an embodiment includes an upper end member that surrounds at least an upper end part of the pathway. The sample tube container includes a receiving chamber in which the sample tube is received, and an opening-closing mechanism. The opening-closing mechanism is provided at a bottom of the receiving chamber, and changes in state from a closed state to an open state when the sample tube container is connected to the upper end member, and from the open state to the closed state when the sample tube container is detached from the upper end member. The opening-closing mechanism includes a plurality of movable elements that support the sample tube inside the receiving chamber while in the closed state.

According to the above configuration, the opening-closing mechanism operates in accordance with connection and detachment of the sample tube container with respect to the upper end member, so that it is unnecessary to control the opening-closing mechanism from outside. Further, the sample tube can be supported stably by the movable elements.

A sample tube transport apparatus according to an embodiment includes a hollow guide member provided inside a bore of a static magnetic field generator. Inside the guide member, the sample tube container performs a dropping motion, by which the sample tube container is connected to the upper end member. A sample tube transport apparatus according to an embodiment includes a lift unit configured to generate an ascending gas stream inside the guide member in order to cause the sample tube container to move away from the guide member and float up.

(2) Details of Embodiments

FIG. 1 shows an NMR measurement system 10 including a sample tube transport apparatus according to an embodiment. The NMR measurement system is a system for analyzing a sample, and is more specifically a system configured to measure NMR occurring in a solid sample.

The NMR measurement system 10 comprises a static magnetic field generator 12, an NMR measurement probe 14, a sample tube transport apparatus 18, a spectrometer 63, and the like. In FIG. 1, illustration of specific configuration of the spectrometer 63 is omitted. The NMR measurement system 10 further comprises a group of flow rate adjusters 48 and a main control unit 60. The group of flow rate adjusters 48 and the main control unit 60 may be recognized as part of the sample tube transport apparatus 18. It is noted that, in FIG. 1, each element is illustrated schematically or illustrated with exaggeration. Further, in FIG. 1, illustration of ducts provided in the interior of the NMR measurement probe 14 is omitted.

The static magnetic field generator 12 comprises a superconducting magnet, and serves to generate a static magnetic field. The direction of the static magnetic field is the vertical direction in FIG. 1. The static magnetic field generator 12 has a bore 12A, which is a through hole or a cavity.

The NMR measurement probe 14 is composed of a main body 20 and a base 22. The main body 20 is a portion inserted into the bore 12A, and has a cylindrical shape. The base 22 is a portion arranged outside (or below) the bore 12A. In the interior of an upper end part of the main body 20, a spinner 24 is arranged together with a detection coil (not shown in the drawing). Further, in the interior of the upper end part of the main body 20, there is provided a structure 30 including a load unit 34 and an eject unit 36 described later in detail.

The base 22 and the spectrometer 63 are electrically connected to each other via a signal line 62. The spectrometer includes a transmitter, a receiver, an NMR spectrum generator, and the like. In the bore 12A, a hollow guide member 16 is arranged. More specifically, the guide member 16 is arranged at an upper part of the main body 20 of the NMR measurement probe 14.

The sample tube transport apparatus 18 is an apparatus that transports a sample tube containing a sample. More specifically, the sample tube transport apparatus 18 serves to transport the sample tube from a carrier 26 to the spinner 24 at the time of loading the sample tube, and to transport the sample tube from the spinner 24 to the carrier 26 at the time of ejecting the sample tube. The carrier 26 is a type of container, and a sample tube received in a holder, a magazine rack, or the like may be loaded. The spinner 24 is a MAS module that causes the sample tube to perform a spinning motion. A pathway for transporting the sample tube is provided between the carrier 26 and the spinner 24.

The sample tube transport apparatus 18 comprises a shaft-like member 28, the structure 30, a curved tube 32, and the like. The carrier 26 and the spinner 24 may be regarded as part of the sample tube transport apparatus 18. In the interior of the shaft-like member 28, a hollow member is arranged, and the interior thereof is part of the pathway. A through hole formed in the structure 30 is also part of the pathway. Further, the interior of the curved tube 32 is also part of the pathway. An upper end portion of the shaft-like member 28 is a portion (i.e., an upper end member) that surrounds an upper end part of the pathway.

The carrier 26 has a receiving chamber in which a sample tube is received. The receiving chamber receives therein a sample tube before being subjected to NMR measurement and a sample tube after being subjected to NMR measurement. The spinner 24 has a receiving space in which a sample tube is received. A spinning drive force is imparted to a sample tube received in the receiving space. One end (or an upper end) of the above-noted pathway adjoins the receiving chamber inside the carrier 26, and the other end (or a lower end) of the above-noted pathway adjoins the receiving space inside the spinner 24.

The structure 30 comprises the load unit 34 and the eject unit 36. The load unit 34 has a jet orifice oriented toward the spinner 24 side, and at the time of loading a sample tube, jets a load gas into the pathway from an oblique direction, as a result of which a first gas stream is generated in the pathway. The first gas stream is a downward stream from above in FIG. 1. By means of the first gas stream, the sample tube is transported from the carrier 26 to the spinner 24.

The eject unit 36 has a jet orifice oriented toward the carrier 26 side, and at the time of ejecting a sample tube, jets an eject gas into the pathway from an oblique direction, as a result of which a second gas stream is generated in the pathway. The second gas stream is an upward stream from below in FIG. 1. By means of the second gas stream, the sample tube is transported from the spinner 24 to the carrier 26.

Prior to performing an NMR measurement, the carrier 26 containing a sample tube is caused to drop into the guide member 16. By this dropping motion, the carrier 26 is caused to be connected to the shaft-like member 28. Subsequently, the sample tube is delivered from the interior of the carrier 26 into the pathway by the first gas stream. After performing the NMR measurement, the sample tube is transported from the spinner 24 to the interior of the carrier 26 by the second gas stream. Subsequently, the carrier 26 is imparted with a floating force provided by a lift gas, and the carrier 26 performs an ascending motion (or floating motion). A stopper (not shown in the drawing) limits the ascent of the carrier 26 to below the stopper. The carrier 26 has a receiving chamber and an opening-closing mechanism, as will be described later.

A duct 38 serves to feed the load gas, a duct 40 serves to feed the eject gas, and a duct 42 serves to feed the lift gas. A duct 44 serves to feed a bearing gas, and a duct 46 serves to feed a drive gas.

In the configuration example shown in drawing, the group of flow rate adjusters 48 is composed of five flow rate adjusters 50, 52, 54, 56, 58. The flow rate adjuster 50 is a controller that adjusts the flow rate of the load gas. The flow rate adjuster 52 is a controller that adjusts the flow rate of the eject gas. The flow rate adjuster 54 is a controller that adjusts the flow rate of the lift gas. The flow rate adjuster 56 is a controller that adjusts the flow rate of the bearing gas. The flow rate adjuster 58 is a controller that adjusts the flow rate of the drive gas.

As the load gas and eject gas noted above, it is possible to use dry air (having, for example, a dew point below 0 degrees Celsius), inert gas (e.g., nitrogen gas or argon gas), a gas obtained by mixing the foregoing, and the like. The flow rate of the load gas and the eject gas is, for example, 1 L/min or higher. The pressure of these gases is, for example, 5 kPa or higher. The gases other than the load gas and the eject gas can similarly be composed of dry air, inert gas, and the like.

The main control unit 60 serves to control operation of the respective elements constituting the NMR measurement system. Operation of the group of flow rate adjusters 48 is controlled by the main control unit 60. The details of the gas control performed by the main control unit 60 will be described later.

In the configuration shown in FIG. 1, the upper end portion of the shaft-like member 28 may be positioned higher than the highest point of the static magnetic field generator 12, and to that upper end portion, a sample tube holder, a magazine rack containing a plurality of sample tubes, and the like may be connected.

Figure 2:
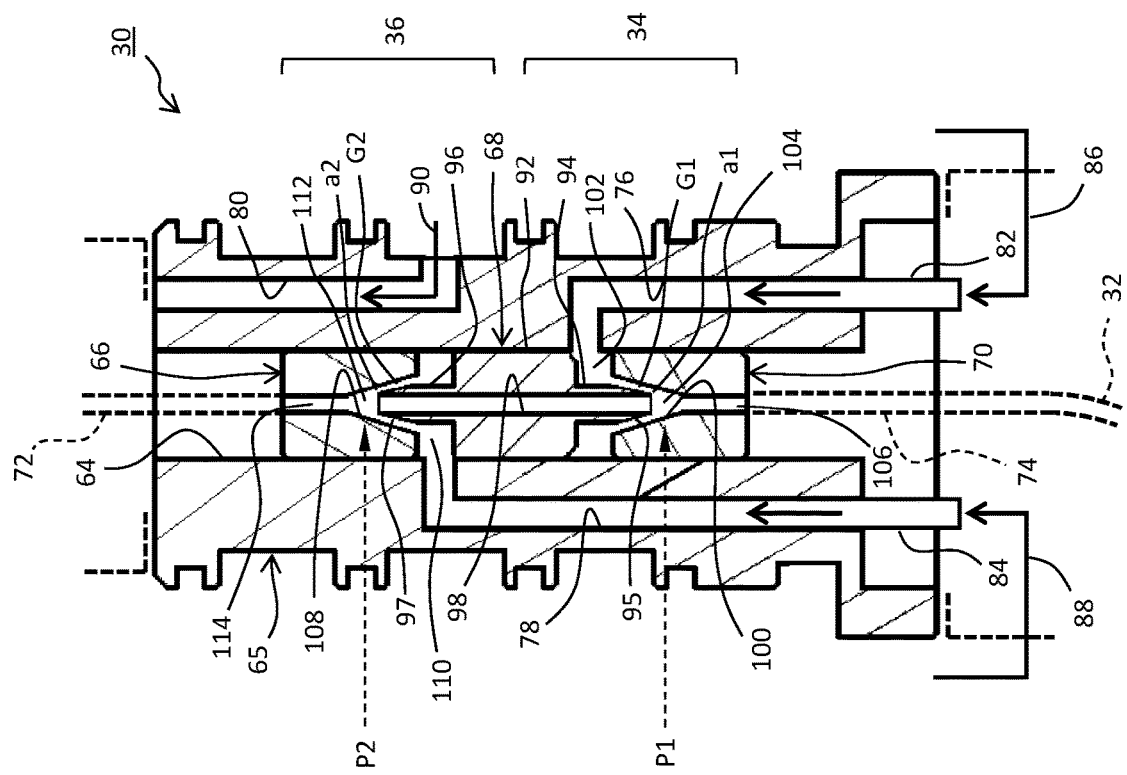
FIG. 2 is a cross-sectional view showing an example of a structure.

FIG. 2 shows a cross section of the structure 30. The structure 30 comprises the load unit 34 and the eject unit 36. P1 denotes a first position where the load gas is jetted, and P2 denotes a second position where the eject gas is jetted.

Describing in more detail, the structure 30 includes a main body 65, an upper member 66, an intermediate member 68, and a lower member 70. The main body 65 has a tubular shape having a vertically-extending through hole 64. In the through hole 64, the upper member 66, the intermediate member 68, and the lower member 70 are arranged.

The main body 65 has a flow path 76 in which the load gas flows, a flow path 78 in which the eject gas flows, and a flow path 80 in which the lift gas flows. The load gas is delivered to the flow path 76 via a port 82. The eject gas is delivered to the flow path 78 via a port 84. The lift gas 90 is delivered to the flow path 80 via a route not shown in the drawing. From the flow path 80, the lift gas is delivered upward. The flow path 80 and a duct or the like connected thereto constitute a lift unit that generates an ascending gas stream. In FIG. 2, illustration of ducts and the like is omitted.

The intermediate member 68 has a downward nozzle 94 and an upward nozzle 96. The intermediate member 68 has a through hole 98. The lower member 70 has a cone-shaped (i.e., conical surface-shaped, funnel-shaped, or umbrella-shaped), sloped surface 100 that surrounds the periphery of the nozzle 94. A cone-shaped slit G1 is formed between the sloped surface 100 and an outer surface (or tapered surface) 95 of the nozzle 94. The slit G1 has an annular outlet (or jet orifice) a1 oriented toward the spinner side. The load gas fed from a retaining chamber 102 adjoining the flow path 76 is jetted via the slit G1 to the first position P1 (in particular, into a junction space 104). By this jetting, the first gas stream is generated in the pathway.

More specifically, by the jetting of the load gas to the first position P1, gas present upstream of the first position P1 is drawn to the first position P1, and at the same time, gas present at the first position P1 is pushed out further downstream. As a result, a first upstream gas stream is generated in a first upstream segment located upstream of the first position P1, and a first downstream gas stream is generated in a first downstream segment located downstream of the first position P1. In the present embodiment, in the first upstream segment, a negative pressure is generated, and atmospheric air present outside moves into the pathway via one end of the pathway or the like. In the first downstream segment, a positive pressure is generated, and gas is discharged outside via the other end of the pathway or the like. The first upstream gas stream and the first downstream gas stream constitute the first gas stream.

A through hole 106 formed in the lower member 70 adjoins the internal space of a linear tube 74. This linear tube 74 is connected to the curved tube 32. The through hole 98, the junction space 104, and the through hole 106 are part of the pathway.

The upper member 66 has a cone-shaped, sloped surface 108 that surrounds the periphery of the nozzle 96. A cone-shaped slit G2 is formed between the sloped surface 108 and an outer surface (or tapered surface) 97 of the nozzle 96. The slit G2 has an annular outlet (or jet orifice) a2 oriented toward the carrier side. The eject gas fed from a retaining chamber 110 adjoining the flow path 78 is jetted via the slit G2 to the second position P2 (in particular, into a junction space 112). By this jetting, the second gas stream is generated.

More specifically, by the jetting of the eject gas to the second position P2, gas present upstream of the second position P2 is drawn to the second position P2, and at the same time, gas present at the second position P2 is pushed out further downstream. As a result, a second upstream gas stream is generated in a second upstream segment located upstream of the second position P2, and a second downstream gas stream is generated in a second downstream segment located downstream of the second position P2. In the present embodiment, in the second upstream segment, a negative pressure is generated, and atmospheric air present outside moves into the pathway via one end of the pathway or the like. In the second downstream segment, a positive pressure is generated, and gas is discharged outside via the other end of the pathway or the like. The second upstream gas stream and the second downstream gas stream constitute the second gas stream.

A through hole 114 formed in the upper member 66 adjoins the junction space 112. The through hole 114 adjoins the internal space of a linear tube 72. The junction space 112 and the through hole 114 are also part of the pathway.

Figure 3:
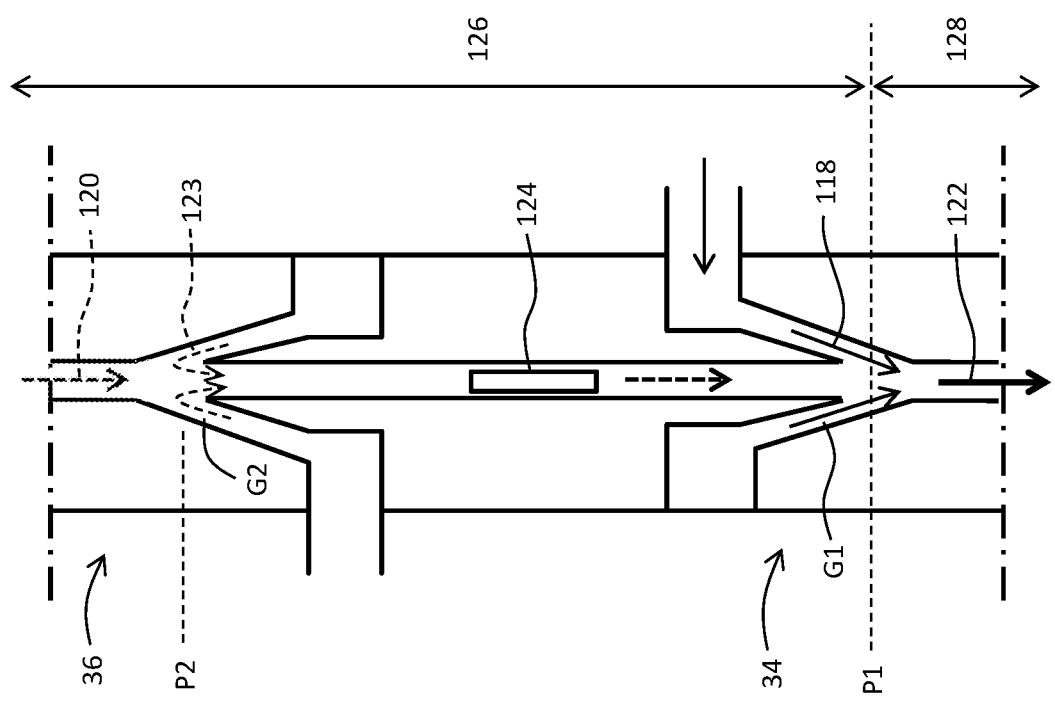
FIG. 3 is a schematic view illustrating an operation performed at the time of loading a sample tube.

FIG. 3 shows an operation performed at the time of loading a sample tube. In the load unit 34, load gas 118 is jetted from the cone-shaped slit G1 toward the first position P1. As a result of this jetting, the first upstream gas stream 120 that provides a first transporting force to a sample tube 124 is generated in the first upstream segment 126 located upstream of the first position P1, and at the same time, the first downstream gas stream 122 that provides a second transporting force to the sample tube is generated in the first downstream segment 128 located downstream of the first position P1. A negative pressure is generated in a first upstream segment 126, and a positive pressure is generated in a first downstream segment 128. Accordingly, the first transporting force is prevented from being excessively large, and in addition, the second transporting force is prevented from being excessively small.

When a sample tube moves through the load unit 34, the load gas is sprayed evenly on the side surface of the sample tube, so that the attitude of the sample tube does not become unstable. At the time of loading a sample tube, the eject unit 36 is not operated, but even if a slight gas flow via the slit G2 is allowed, there only results a gas stream 123 moving into the pathway, and the attitude of the sample tube moving through the eject unit 36 does not become unstable.

Figure 4:
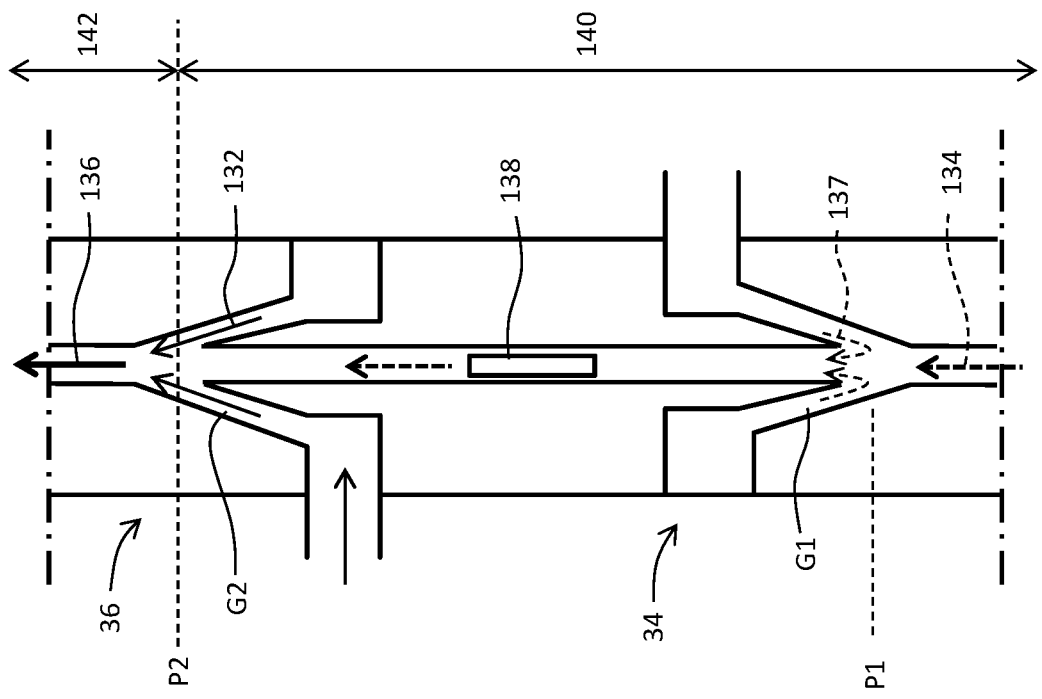
FIG. 4 is a schematic view illustrating an operation performed at the time of ejecting a sample tube.

FIG. 4 shows an operation performed at the time of ejecting a sample tube. In the eject unit 36, an eject gas 132 is jetted from the cone-shaped slit G2 toward the second position P2. As a result of this jetting, a second upstream gas stream 134 that provides a third transporting force to a sample tube 138 is generated in a second upstream segment 140 located upstream of the second position P2, and at the same time, a second downstream gas stream 136 that provides a fourth transporting force to the sample tube is generated in a second downstream segment 142 located downstream of the second position P2. A negative pressure is generated in the second upstream segment 140, and a positive pressure is generated in the second downstream segment 142. Accordingly, the third transporting force is prevented from being excessively large, and in addition, the fourth transporting force is prevented from being excessively small.

When a sample tube moves through the eject unit 36, the eject gas is sprayed evenly on the side surface of the sample tube, so that the attitude of the sample tube does not become unstable. At the time of ejecting a sample tube, the load unit 34 is not operated, but even if a slight gas flow via the slit G1 is allowed, there only results a gas stream 137 moving into the pathway, and the attitude of the sample tube moving through the load unit 34 does not become unstable.

In the configuration shown in FIGS. 2 to 4, the load 34 and the eject unit 36 are formed in an adjoining manner. That is, these two units are formed as one unit. Accordingly, the central axes of the two units 34, 36 can be easily aligned. Further, advantages such as reduced number of components, ease of assembly, and the like can be obtained. However, the two units 34, 36 may be formed as separate units.

Figure 5:
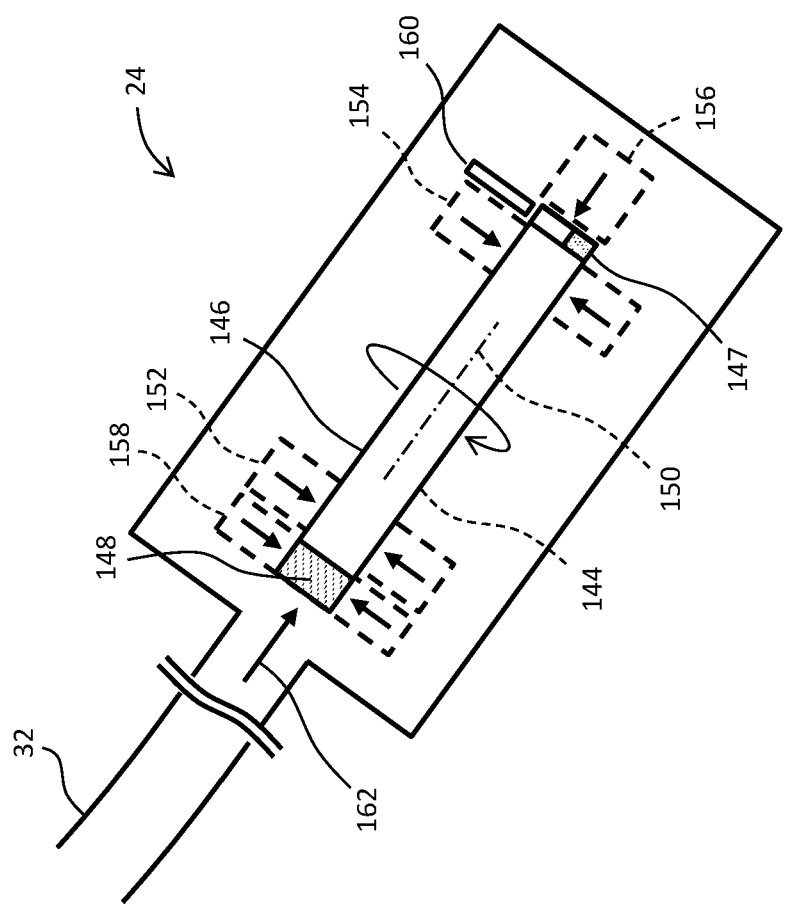
FIG. 5 is a schematic view showing a spinner.

FIG. 5 schematically illustrates the spinner 24. The spinner 24 is joined to an end part of the curved tube 32. The spinner 24 has a receiving space 144 in which a sample tube 146 is received. At one end of the sample tube 146, a marker 147 for spin detection is provided. At the other end of the sample tube 146, turbine blades 148 are provided. The interior of the sample tube 146 is a sample chamber in which a sample is received.

The diameter of the sample tube 146 is, for example, in a range from 0.5 to 2 mm. In particular, when the diameter of the sample tube 146 is about 1 mm or smaller, the sample tube 146 tends to stop at a midway point in the pathway due to causes such as static electricity and soiling on the sample tube surface. In the present embodiment, since the load unit and the eject unit are provided as described above, it is possible to reliably prevent stopping of the sample tube at the time of loading the sample tube and at the time of ejecting the sample tube.

Two gas bearings 152, 154 are provided to encircle the receiving space 144. Each of the gas bearings 152, 154 is a mechanism that holds the sample tube 146 in a contactless manner by spraying a bearing gas on the side surface of the sample tube 146. There is also provided a thrust gas bearing 156 that sprays gas on one end face of the sample tube 146. A drive unit 158 serves to generate a spinning force on the sample tube 146 by spraying the drive gas on the turbine blades 148. Reference numeral 150 denotes the central axis of the sample tube 146, which corresponds to the spin axis.

In the present embodiment, even while a sample tube is in a spinning state after being loaded, the load gas is fed into the pathway, or in other words, the first gas stream is maintained. Gas 162 provided by the first gas stream is sprayed on the other end face of the sample tube 146. The spray direction of the gas 162 is a direction opposite to the gas spray direction of the thrust gas bearing 156. With this arrangement, the position of the sample tube 146 in the direction of the central axis 150 can be maintained with high accuracy.

A detector 160 serves to detect spinning of the sample tube 146. The detector 160 comprises an optical fiber that emits laser light, and an optical fiber that receives laser light reflected by the sample tube (i.e., reflected light). Since the marker 147 rotates in accordance with the spinning of the sample tube 146, the amount of the reflected light changes periodically. Based on this change, the number of spins per unit time; namely, the spin speed, is calculated.

Figure 6:
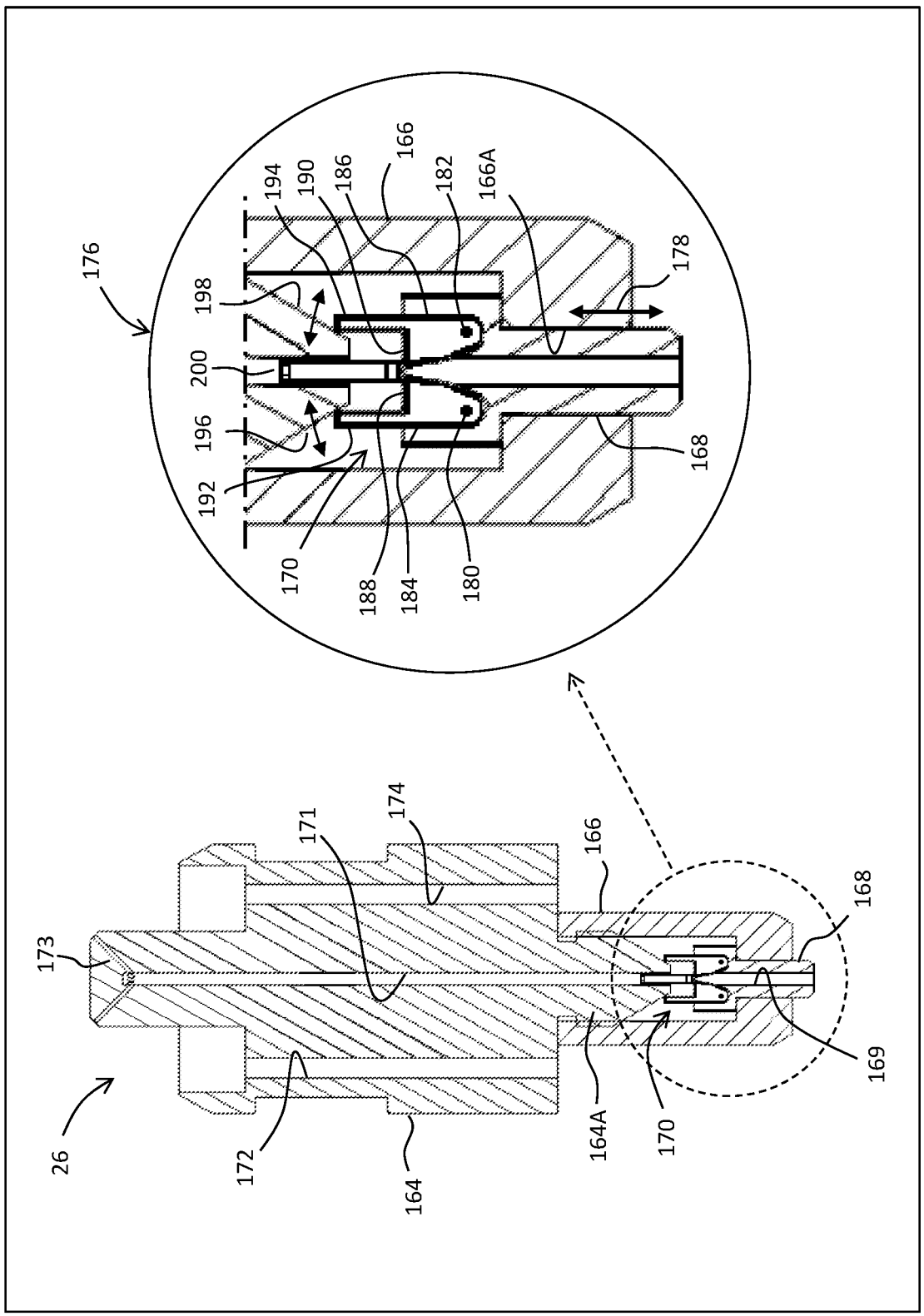
FIG. 6 is a cross-sectional view showing a carrier (or container)

FIG. 6 shows a cross section of the carrier 26. In FIG. 6, illustration of the ducts and the like is omitted.

The carrier 26 comprises a main body 164, a cap 166, a movable member 168, and an opening-closing mechanism 170. The main body 164 has a through hole 172 for load gas and a through hole 174 for eject gas. Although the main body 164 additionally has a through hole for lift gas, this through hole does not appear in FIG. 1. Inside the main body 164, a receiving chamber 171 is formed. An upper end part of the receiving chamber 171 is connected to outside via communication holes 173. The main body 164 has a protrusion 164A protruding downward. The cap 166 is provided covering the protrusion 164A. The opening-closing mechanism 170 is provided in the interior of the cap 166.

Reference numeral 176 denotes an enlarged view of a part surrounded by a dashed-line circle in FIG. 6. A shaft portion of the movable member 168 passes through an opening 166A formed in the cap 166. In the configuration example shown in drawing, the opening-closing mechanism 170 has two levers 184, 186. The two levers 184, 186 are arranged evenly around the central axis of the carrier, or more specifically, are arranged on one side and the other side of the central axis. The levers 184, 186 are movable pieces that can perform a pivoting motion about pivot axes 180 and 182, respectively.

The lever 184 has a shoulder portion 188 and an upper end portion 192. When the opening-closing mechanism 170 is in a closed state, the shoulder portion 188 functions as a base that supports a sample tube 200. A sloped surface is formed below the shoulder portion 188. The upper end portion 192 is in abutment against a sloped surface 196 formed on the protrusion. When the lever 184 is in a descended state, the lever 184 is placed in an erect orientation (or vertical orientation). When the lever performs an ascending motion, the upper end portion 192 performs an opening motion in the leftward direction in the drawing along the sloped surface 196, and the lever 184 is placed in an inclined orientation. In that state, the supporting effect of the shoulder portion 188 is cancelled.

The lever 184 and the lever 186 are in a line-symmetric relationship to each other. The lever 186 has a shoulder portion 190 and an upper end portion 194. When the opening-closing mechanism 170 is in the closed state, the shoulder portion 190 functions as a base that supports the sample tube 200. A sloped surface is formed below the shoulder portion 190. The upper end portion 194 is in abutment against a sloped surface 198 formed on the protrusion. When the lever 186 is in a descended state, the lever 186 is placed in an erect orientation (or vertical orientation). When the lever 186 performs an ascending motion, the upper end portion 194 performs an opening motion in the rightward direction in the drawing along the sloped surface 198, and the lever 186 is placed in an inclined orientation. In that state, the supporting effect of the shoulder portion 190 is cancelled.

As shown by reference numeral 178, the movable member 168 is capable of performing a vertical motion. When the movable member 168 abuts against a tip end portion of the shaft-like member and performs an ascending motion, the opening-closing mechanism 170 changes in state from the closed state to an open state. As a result, the bottom of the receiving chamber is opened. When the carrier 26 detaches from the tip end portion of the shaft-like member and the movable member 168 performs a descending motion, the opening-closing mechanism 170 changes in state from the open state to the closed state. As a result, the bottom of the receiving chamber is closed.

Each of the levers 184, 186 is a movable element constituting the opening-closing mechanism 170. Three or more levers may be provided. Instead of levers, movable pieces or spring members may be provided. In that case, each of the spring members deforms elastically in accordance with motion of the movable member 168. The movable pieces or spring members are provided evenly around the central axis of the carrier 26.

Figure 7:
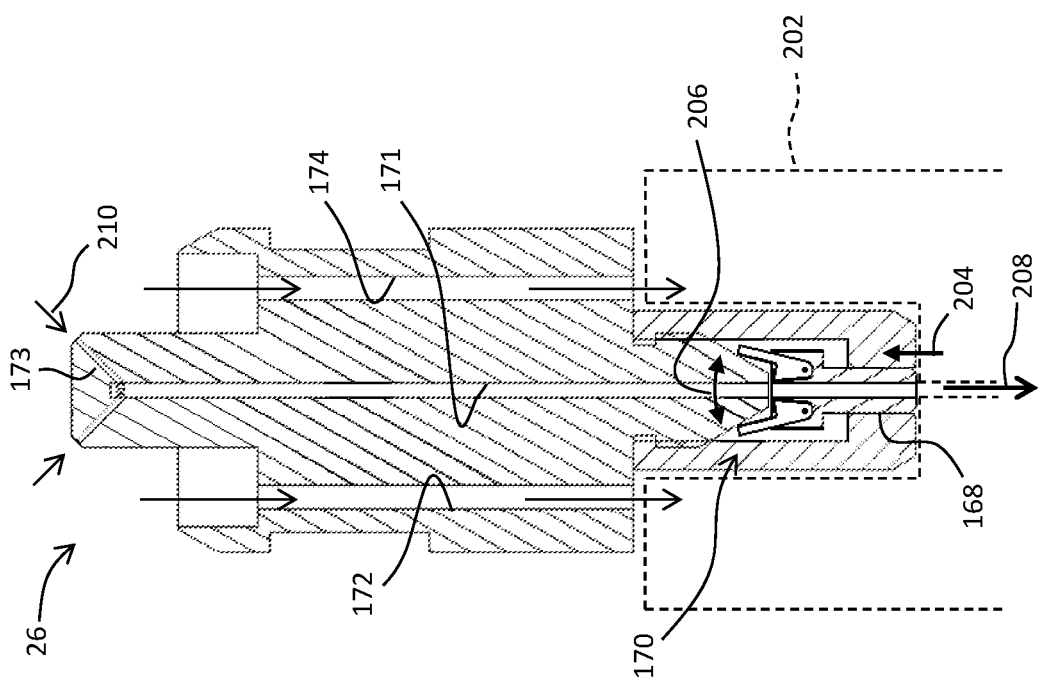
FIG. 7 is a cross-sectional view illustrating an operation of the carrier.

FIG. 7 shows a connected state. After the carrier 26 performs a dropping motion, the carrier 26 couples to an upper end portion 202 of the shaft-like member. This causes a pushing-up force to occur on the movable member 168, and the movable member 168 performs an ascending motion. As a result, the opening-closing mechanism 170 changes in state from the closed state to the open state as shown by reference numeral 206. At the same time, the load gas is fed into the pathway, and the first gas stream is generated. A sample tube inside the receiving chamber 171 is moved downward by the effect of gravity and the first gas stream. As described above, the receiving chamber 171 is connected to outside via the communication holes 173. Atmospheric air flows into the receiving chamber from outside via the communication holes 173. The upper end portion 202 is the upper end member that surrounds an upper end part of the pathway.

Figure 8:
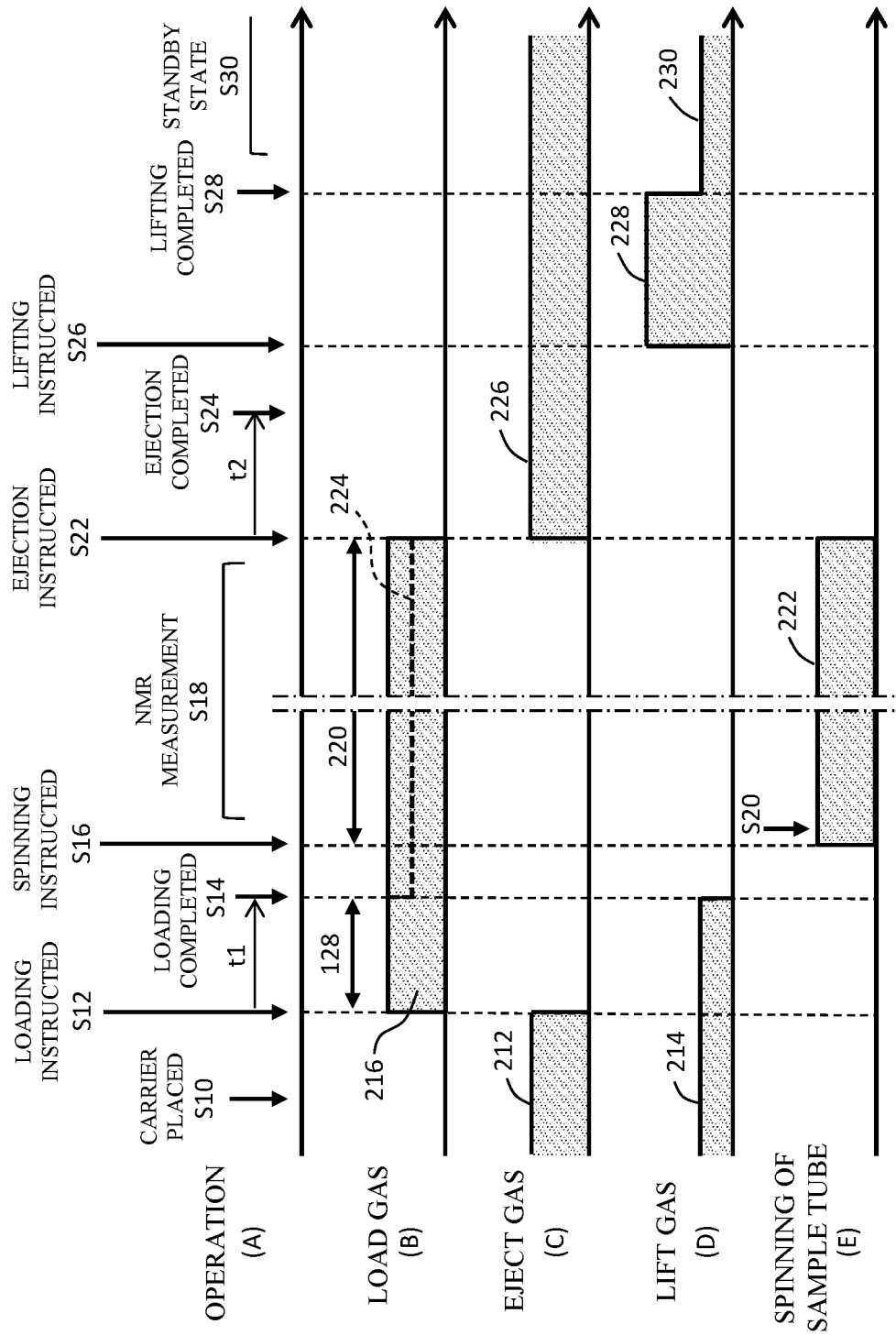
FIG. 8 is a timing chart illustrating gas feed control.

FIG. 8 illustrates gas control executed by the main control unit. While in a standby state, in S10, the carrier is placed inside the guide member. The carrier performs a dropping motion, and this results in the connected state. In the standby state, feeding of the eject gas is continued (see reference numeral 212), and feeding of the lift gas is also continued (see reference numeral 214). The flow rate of the lift gas is a low flow rate at a level that does not obstruct the dropping motion of the carrier.

In S12, the main control unit outputs a load instruction. For example, the load instruction may be output in accordance with a predetermined manipulation performed by a user. At the point when the load instruction is output, feeding of the eject gas is stopped, and feeding of the load gas is started (see reference numeral 216). In S14, loading of the sample tube is completed. That is, the sample tube is arranged inside the spinner. In practice, completion of the loading is determined at a point of time after an elapse of certain time t1 from the load instruction. Reference numeral 128 denotes the duration of the sample tube transport by the first gas stream generated by the feeding of the load gas.

In S16, a spin instruction is output from the main control unit. As a result, feeding of the bearing gas and the drive gas to the spinner is started (see reference numeral 222). After spinning is started, in S20, whether or not the sample tube is spinning is determined. By this determination, whether or not the sample tube is held in the spinner is checked retroactively. An error operation performed in cases where the sample tube is not held in the spinner will be described later.

In S18, NMR measurement is performed. Over the entire NMR measurement period, the first gas stream is maintained (see reference numeral 220). This suppresses positional deviation of the sample tube in the thrust direction. During the NMR measurement period, the flow rate of the first gas stream may be changed. For example, a first flow rate may be set at the time of loading, and a second flow rate lower than the first flow rate may be set at the time of spinning.

After termination of the NMR measurement, in S22, the main control unit outputs an eject instruction. At that point, feeding of the load gas is stopped, and at the same time, the eject gas is fed, by which the second gas stream is generated (see reference numeral 226). In S24, completion of ejection is determined. In practice, completion of ejection is determined at a point of time after an elapse of predetermined time t2 from the eject instruction. A sensor that detects the sample tube may be provided in the carrier, and completion of ejection may be determined based on an output signal from the sensor.

In S26, the main control unit outputs a lift instruction. As a result, the lift gas is fed. The flow rate thereof is a high flow rate (see reference numeral 228). By means of the ascending gas stream, the carrier is lifted upward to a predetermined position. In S28, completion of the lifting is determined. At that point, the flow rate of the lift gas is changed from the high flow rate to the low flow rate (see reference numeral 230). As a result, in S30, there is created a state awaiting input of a subsequent carrier (i.e., the standby state). In the standby state, both the eject gas and the lift gas are caused to flow, by which entry of foreign matters into the bore including the pathway is prevented.

Figure 9:
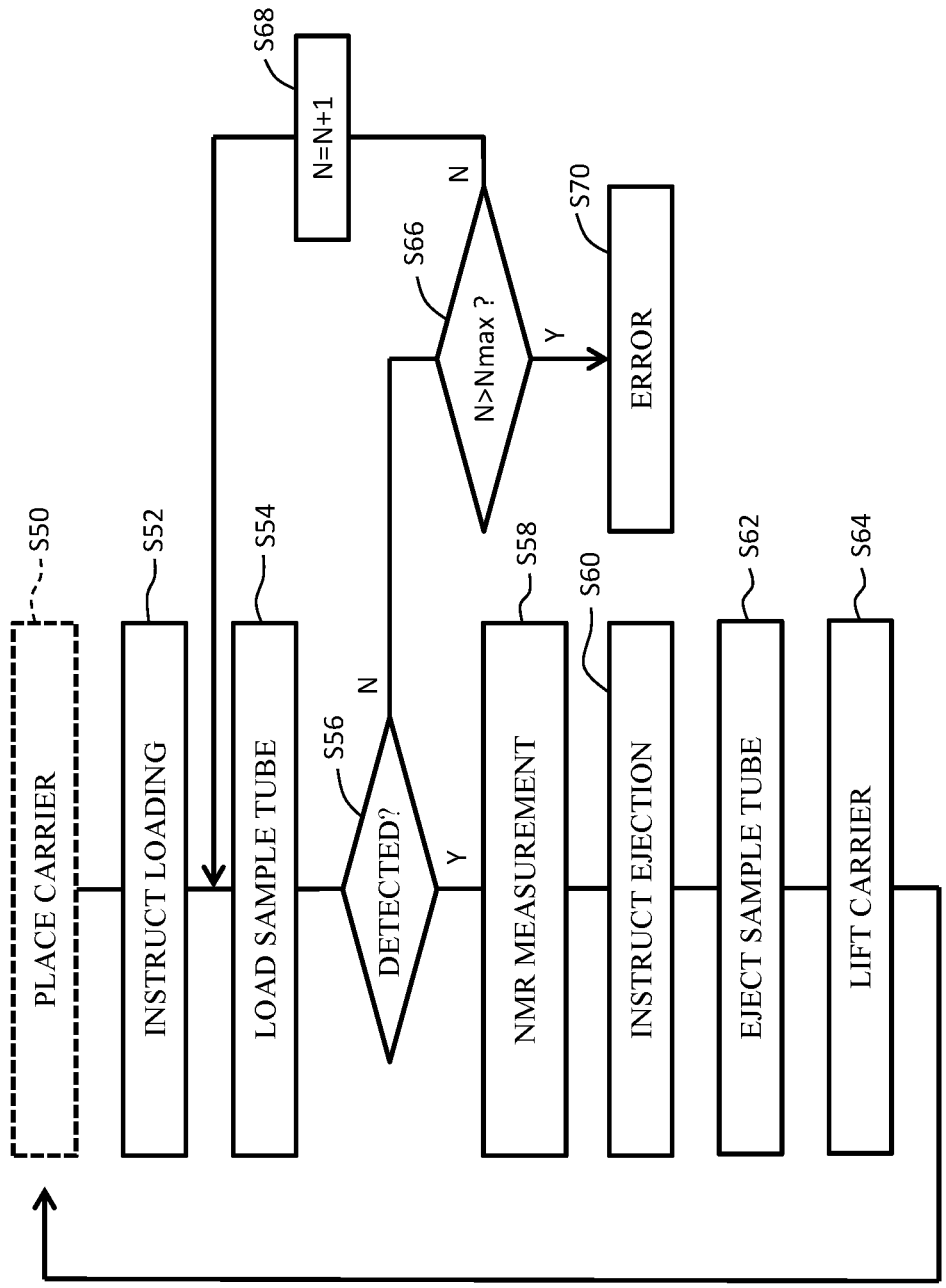
FIG. 9 is a flowchart illustrating an example of operation of the sample tube transport apparatus.

FIG. 9 illustrates an example of operation of the sample tube transport apparatus. FIG. 9 serves to illustrate the details of control performed by the main control unit. In FIG. 9, particulars regarding the gas control are omitted.

In S50, a user places the carrier at the inlet of the guide member. After that, the connected state occurs. In S52, the main control unit outputs a load instruction. In S54, the sample tube is loaded. That is, the sample tube is transported from the carrier to the spinner. In S56, after spinning is started, whether or not the sample tube is spinning is determined.

In cases where spinning is detected in S56, in S58, NMR measurement is executed. After termination thereof, in S60, the main control unit outputs an eject instruction. In S62, ejection of the sample tube is performed. In S64, the lift gas is fed, and the carrier is lifted upward.

On the other hand, in cases where spinning is not detected in S56, in S66, it is determined whether or not the number N of load operations has exceeded a maximum value Nmax. When the number N of load operations is less than or equal to the maximum value Nmax, the number N of load operations is incremented in S68, and then S54 and the subsequent steps are executed again. The initial value of the number N of load operations is 1. When it is determined in S66 that the number N of load operations has exceeded the maximum value Nmax, an error processing is executed in S70. For example, an error is reported to the user.

Figure 10:
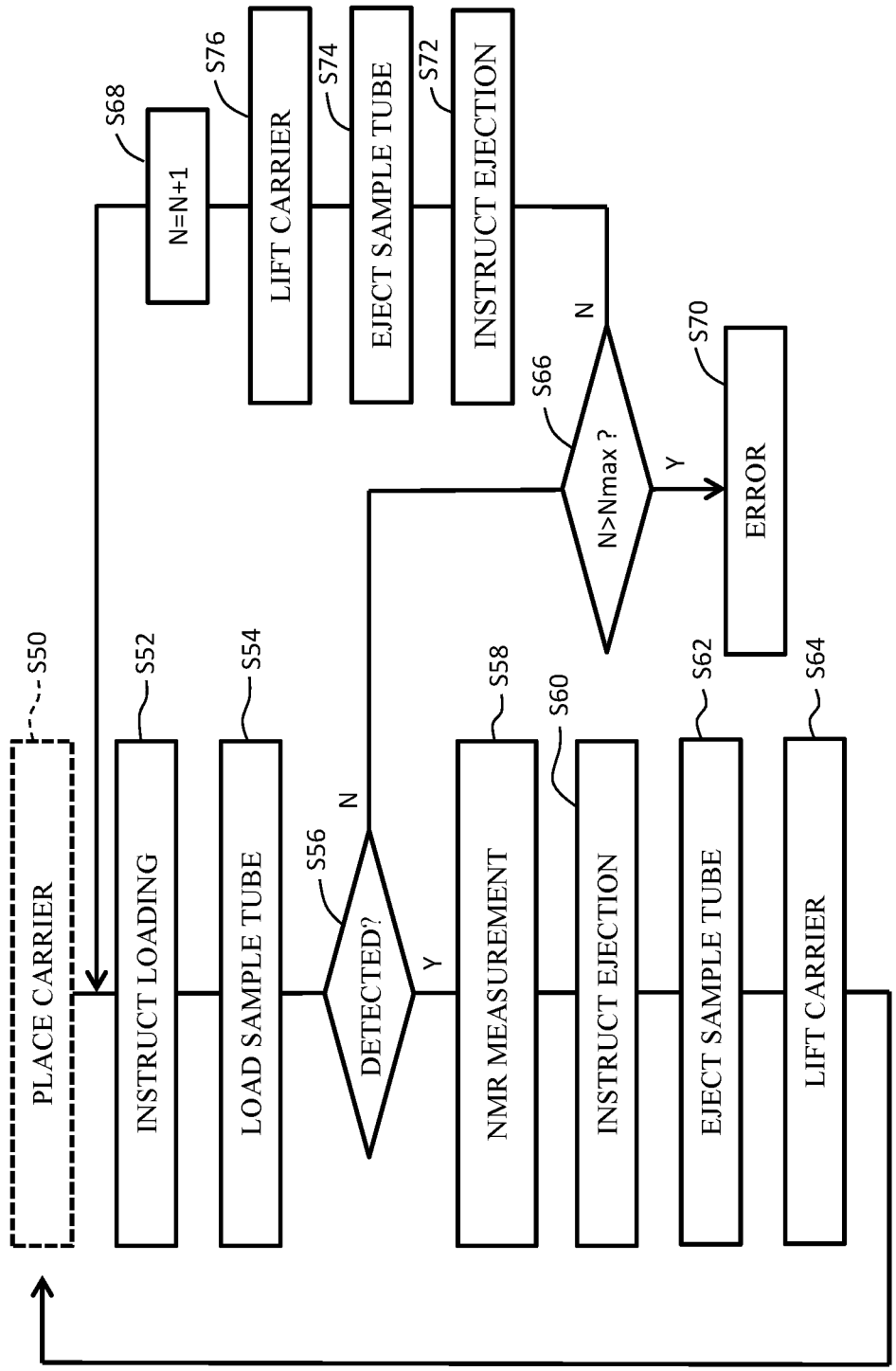
FIG. 10 is a flowchart illustrating another example of operation of the sample tube transport apparatus.

FIG. 10 illustrates another example of operation of the sample tube transport apparatus. In FIG. 10, steps identical to those shown in FIG. 9 are assigned like step numerals, and repeated description thereof is omitted. When the number N of load operations is less than or equal to the maximum value Nmax in S66, in S72, an eject instruction is output, and an eject operation is executed accordingly in S74. Further, in S76, an operation of causing the carrier to float up is executed. Then, in S68, the number N of load operations is incremented. After that, S52 and the subsequent steps are executed again. For example, operation according to this another example illustrated in FIG. 10 can be employed in cases where failure in the state of coupling of the carrier is suspected.

Figure 11:
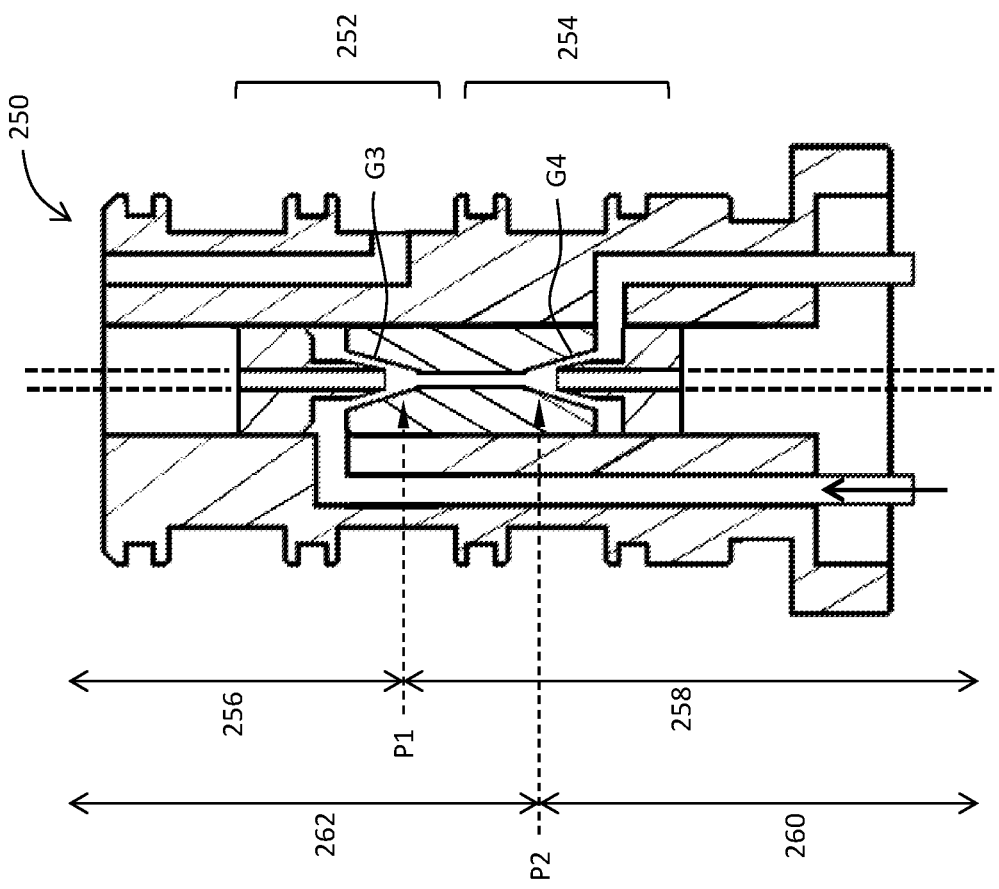
FIG. 11 is a cross-sectional view showing another example of the structure.

FIG. 11 shows another example of the structure. A structure 250 comprises a load unit 252 and an eject unit 254. The unit provided toward above is the load unit 252, and the unit provided toward below is the eject unit 254.

The load unit 252 serves to jet the load gas from a cone-shaped slit G3 to the first position P1, thereby generating the first gas stream. The eject unit 254 serves to jet the eject gas from a cone-shaped slit G4 to the second position P2, thereby generating the second gas stream. The outlet (or jet orifice) of the slit G3 is oriented downward, and the outlet (or jet orifice) of the slit G4 is oriented upward.

At the time of loading a sample tube, a negative pressure is generated in a first upstream segment 256 located upstream of the first position P1, and a positive pressure is generated in a first downstream segment 258 located downstream of the first position P1. At the time of ejecting a sample tube, a negative pressure is generated in a second upstream segment 260 located upstream of the second position P2, and a positive pressure is generated in a second downstream segment 262 located downstream of the second position P2.

Figure 12:
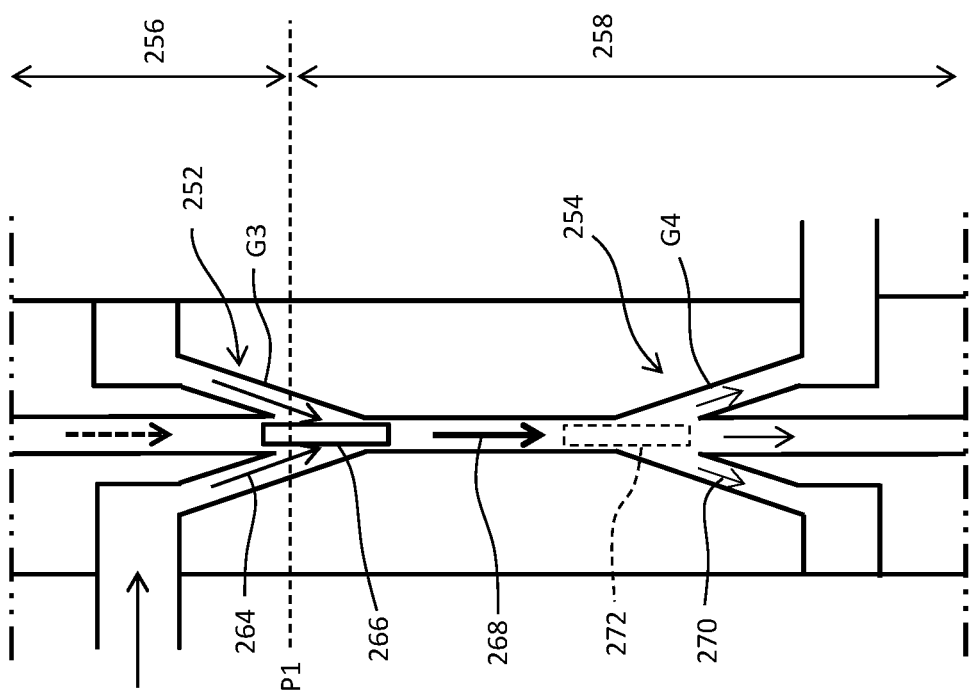
FIG. 12 is a diagram illustrating an operation of the structure shown in FIG. 11.

FIG. 12 illustrates an operation of the structure shown in FIG. 11 performed at the time of loading a sample tube. In the load unit 252, a load gas 264 is jetted from the slit G3 to the first position P1, and the first gas stream is thereby generated. Within the load unit 252, the load gas 264 is sprayed evenly on a side surface of the sample tube 266, so that the attitude of the sample tube does not become unstable.

Here, a positive pressure is generated in the first downstream segment 258, and in cases where a slight gas flow is allowed through the slit G4, a gas stream 270 moving into the slit G4 may be generated. There is a concern that, due to such a gas stream 270, the attitude of the sample tube 272 may become unstable. In order to avoid such a problem, it is desired to employ the structure shown in FIG. 2. However, in cases where the problem of attitude instability of the sample tube 272 does not occur, the structure shown in FIG. 11 may be employed.

FIG. 13 shows a sample tube transport apparatus according to another embodiment. A sample tube transport apparatus 273 serves to transport a sample tube between the carrier 26 and the spinner 24. The sample tube transport apparatus 273 comprises a shaft-like member 280, a load unit 276, an eject unit 278, a shaft-like member 274, a curved tube, and the like.

The load unit 276 jets the load gas to the first position located in the pathway, thereby generating the first gas stream in the pathway. The first gas stream is a downward stream in FIG. 13. The eject unit 278 jets the eject gas to the second position located in the pathway, thereby generating the second gas stream in the pathway. The second gas stream is an upward stream in FIG. 13. As the load unit 276 and the eject unit 278, the configuration shown in FIG. 2 may be employed.

The load unit 276 and the eject unit 278 are provided at a position close to the carrier 26, or more specifically, at a position outside the static magnetic field generator. In the configuration shown in FIG. 13, the dropping motion and the floating motion of the carrier 26 are not performed. For example, the carrier 26 is mounted to the shaft-like member 280 by a user.

In the configuration shown in FIG. 13, the first upstream segment and the first downstream segment are defined with the first position serving as the boundary. Further, the second upstream segment and the second downstream segment are defined with the second position serving as the boundary. In cases where an excessively large transporting force in the first downstream segment and an excessively small transporting force in the second downstream segment present problems, it is desired to employ the configuration shown in FIG. 1.

In the configuration shown in FIG. 13, the positions at which the load unit 276 and the eject unit 278 are located may be changed. The load unit 276 and the eject unit 278 may be arranged at an intermediate position which is inside the bore and above the NMR probe.

Although a sample tube is input from the upper side of the static magnetic field generator in the above embodiments, the sample tube may alternatively be input from the lower side of the static magnetic field generator. In that case, by likewise setting the first position and the second position at midway points in the pathway, similar effects and advantages can be obtained as in the above embodiments. In the above embodiments, a cryogenic NMR measurement probe may be used.

The technique of spraying gas on the other end face of a sample tube while the sample tube is in the spinning state may be applied to a sample tube transport apparatus other than the sample tube transport apparatus according to the embodiments. Further, the carrier having the opening-closing mechanism may be used in a sample tube transport apparatus other than the sample tube transport apparatus according to the embodiments (for example, in an apparatus for transporting a sample tube containing a solution sample).

The invention claimed is:

1. A sample tube transport apparatus, comprising:
   a load unit configured to, before NMR measurement is performed with respect to a sample inside a sample tube, jet a load gas to a first position in a pathway between a sample tube container and a sample tube spinner, and thereby generate a first gas stream that transports the sample tube from the sample tube container to the sample tube spinner; and
   an eject unit configured to, after NMR measurement is performed with respect to the sample, jet an eject gas to a second position in the pathway, and thereby generate a second gas stream that transports the sample tube from the sample tube spinner to the sample tube container,
   wherein the load unit comprises a first slit which has a first outlet oriented toward the sample tube spinner and through which the load gas is jetted into the pathway, and
   the eject unit comprises a second slit which has a second outlet oriented toward the sample tube container and through which the eject gas is jetted into the pathway.

2. The sample tube transport apparatus according to claim 1, wherein
   each of the first slit and the second slit is a cone-shaped slit, and
   each of the first outlet and the second outlet is an annular outlet.

3. The sample tube transport apparatus according to claim 1, wherein
   of the first position and the second position, the one closer to the sample tube spinner is the first position, and the one closer to the sample tube container is the second position.

4. The sample tube transport apparatus according to claim 1, wherein
   the load unit and the eject unit are joined to each other.

5. The sample tube transport apparatus according to claim 1, comprising
   an upper end member that surrounds at least an upper end part of the pathway, wherein
   the sample tube container comprises:
      a receiving chamber in which the sample tube is received; and
      an opening-closing mechanism which is provided at a bottom of the receiving chamber, and which changes in state from a closed state to an open state when the sample tube container is connected to the upper end member, and from the open state to the closed state when the sample tube container is detached from the upper end member, and
      the opening-closing mechanism comprises a plurality of movable elements that support the sample tube inside the receiving chamber while in the closed state.

6. The sample tube transport apparatus according to claim 5, comprising
   a hollow guide member provided inside a bore of a static magnetic field generator, wherein
   inside the guide member, the sample tube container performs a dropping motion, by which the sample tube container is connected to the upper end member.

7. The sample tube transport apparatus according to claim 6, comprising
   a lift unit configured to generate an ascending gas stream inside the guide member in order to cause the sample tube container to move away from the guide member and float up.

8. A sample tube transport apparatus comprising:
   a load unit configured to, before NMR measurement is performed with respect to a sample inside a sample tube, jet a load gas to a first position in a pathway between a sample tube container and a sample tube spinner, and thereby generate a first gas stream that transports the sample tube from the sample tube container to the sample tube spinner; and
   an eject unit configured to, after NMR measurement is performed with respect to the sample, jet an eject gas to a second position in the pathway, and thereby generate a second gas stream that transports the sample tube from the sample tube spinner to the sample tube container, wherein
   the sample tube spinner comprises a thrust gas bearing configured to spray gas on one end face of the sample tube received in the sample tube spinner,
   the load unit generates the first gas stream while in a spinning state in which the sample tube is spinning inside the sample tube spinner, and
   while in the spinning state, gas provided by the first gas stream is sprayed on the other end face of the sample tube.

9. A sample tube transport apparatus comprising:
   a load unit configured to, before NMR measurement is performed with respect to a sample inside a sample tube, jet a load gas to a first position in a pathway between a sample tube container and a sample tube spinner, and thereby generate a first gas stream that transports the sample tube from the sample tube container to the sample tube spinner; and
   an eject unit configured to, after NMR measurement is performed with respect to the sample, jet an eject gas to a second position in the pathway, and thereby generate a second gas stream that transports the sample tube from the sample tube spinner to the sample tube container, wherein
   the eject unit generates the second gas stream even after the sample tube is returned to inside the sample tube container.

* * * * *